US006539279B1

(12) United States Patent
Tamai et al.

(10) Patent No.: US 6,539,279 B1
(45) Date of Patent: Mar. 25, 2003

(54) IMAGE FORMING APPARATUS FOR SORTING AND DISCHARGING PRINTED SHEETS INTO MAIL BINS

(75) Inventors: Yoshiyuki Tamai, Toyokawa (JP); Takashi Onishi, Toyohashi (JP); Tsuyoshi Morimoto, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 31 days.

(21) Appl. No.: 09/635,894

(22) Filed: Aug. 11, 2000

(30) Foreign Application Priority Data

Aug. 19, 1999 (JP) .......................................... 11-232662

(51) Int. Cl.[7] .................................................. G06F 7/00

(52) U.S. Cl. ........................ 700/227; 700/223; 700/224; 700/226; 270/52.02

(58) Field of Search ....................... 270/52.02; 700/223, 700/224, 225, 226, 227; 209/52.02

(56) References Cited

U.S. PATENT DOCUMENTS

| | | | | | |
|---|---|---|---|---|---|
| 4,310,235 | A | * | 1/1982 | Lorenzo et al. | 355/6 |
| 4,860,119 | A | * | 8/1989 | Maniwa et al. | 358/296 |
| 4,970,544 | A | * | 11/1990 | Furusawa et al. | 355/24 |
| 4,998,213 | A | * | 3/1991 | Suzuki et al. | 364/519 |
| 5,007,003 | A | * | 4/1991 | Suzuki et al. | 364/519 |
| 5,072,310 | A | * | 12/1991 | Yamamoto et al. | 358/448 |
| 5,159,324 | A | * | 10/1992 | Ohtani et al. | 340/712 |
| 5,159,546 | A | * | 10/1992 | Inoue et al. | 364/146 |
| 5,295,181 | A | * | 3/1994 | Kuo | 379/100 |
| 5,358,238 | A | | 10/1994 | Mandel et al. | |
| 5,435,544 | A | | 7/1995 | Mandel | |
| 5,464,200 | A | * | 11/1995 | Nakazato et al. | 270/53 |
| 5,608,494 | A | | 3/1997 | Ogura et al. | |
| 5,617,528 | A | * | 4/1997 | Stechmann et al. | 395/326 |
| 5,815,764 | A | * | 9/1998 | Tomory | 399/1 |
| 5,823,529 | A | | 10/1998 | Mandel et al. | |
| 6,111,659 | A | * | 8/2000 | Murata | 358/296 |
| 6,244,594 | B1 | * | 6/2001 | Areseki et al. | 271/293 |
| 6,246,926 | B1 | * | 6/2001 | Ishii et al. | 700/223 |
| 6,349,243 | B1 | * | 2/2002 | Takagi | 700/223 |

* cited by examiner

*Primary Examiner*—Donald P. Walsh
*Assistant Examiner*—Michael C. Butler
(74) *Attorney, Agent, or Firm*—Morrison & Foerster LLP

(57) ABSTRACT

An image forming apparatus includes a printer section for printing an image on a sheet and a finisher having a plurality of mail bins. The image forming apparatus discharges print, which is addressed to a specified user and outputted from the printer section, onto the mail bin assigned to the user among the plurality of mail bins, facilitating mail bin assignment to allow labor of network management to be saved. There is provided a card reading device for reading an ID card for identifying a user. There is also provided assigning means that identifies the user from information read by the card reading device when the ID card is inserted into the card reading device and that assigns a mail bin to the user when no mail bin has been assigned to the user.

20 Claims, 9 Drawing Sheets

IMAGE FORMING APPARATUS FOR SORTING AND DISCHARGING PRINTED SHEETS INTO MAIL BINS

This application is based on application No. H11-232662 filed in Japan, the entire content of which is hereby incorporated by reference.

BACKGROUND OF THE INVENTION

The present invention relates to an image forming apparatus, and in particular, to an image forming apparatus that has a printer section for printing an image on a sheet and a finisher having a plurality of mail bins and that sorts and discharges printed sheets into the mail bins.

In general, according to this type of image forming apparatus, each mail bin is preparatorily assigned to each user by operating an operation panel mounted on a main body of the image forming apparatus or by operating a utility at a terminal on a network. Upon receiving a print job from a specified user through the network, the image is printed on a sheet in the printer section, and the printed sheet is discharged onto the mail bin assigned to the user among a plurality of mail bins.

However, in the case that the image forming apparatus is used in an office or the like, then the mail bin assignment is to be redone by operating the operation panel mounted on the image forming apparatus main body or by operating the utility at the network terminal when organizational changes or personnel changes occur in the relevant office or the like. This leads to an disadvantage that management of the network becomes troublesome.

Accordingly, the object of the present invention is to provide an image forming apparatus capable of saving a labor of network management by facilitating mail bin assignment. It is a further object to provide an image forming apparatus that allows a greater number of users to smoothly use mail bins of the image forming apparatus.

SUMMARY OF THE INVENTION

In order to achieve the above-mentioned objects, the present invention provides an image forming apparatus that includes a printer section for printing an image on a sheet and a finisher having a plurality of mail bins and that discharges print, which are addressed to a specified user and outputted from the printer section, onto the mail bin assigned to the user among the plurality of mail bins. The image forming apparatus further includes a card reading device for reading an ID from an ID card for identifying the user and assigning means for assigning a mail bin to the user who is identified from ID information read by the card reading device.

In the image forming apparatus of the present invention, the assigning means identifies the user from the ID information read by the card reading device and assigns a mail bin to the user. As a result, print that is outputted from the printer section and addressed to the user is discharged onto the mail bin assigned to the user. This arrangement obviates need for redoing the mail bin assignment by operating an operation panel mounted on a main body of the image forming apparatus or by operating a utility at a network terminal when organizational changes or personnel changes occur in an office or the like where this image forming apparatus is used. As a result, labor of network management can be saved.

BRIEF DESCRIPTION OF THE DRAWINGS

The present invention will become more fully understood-from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
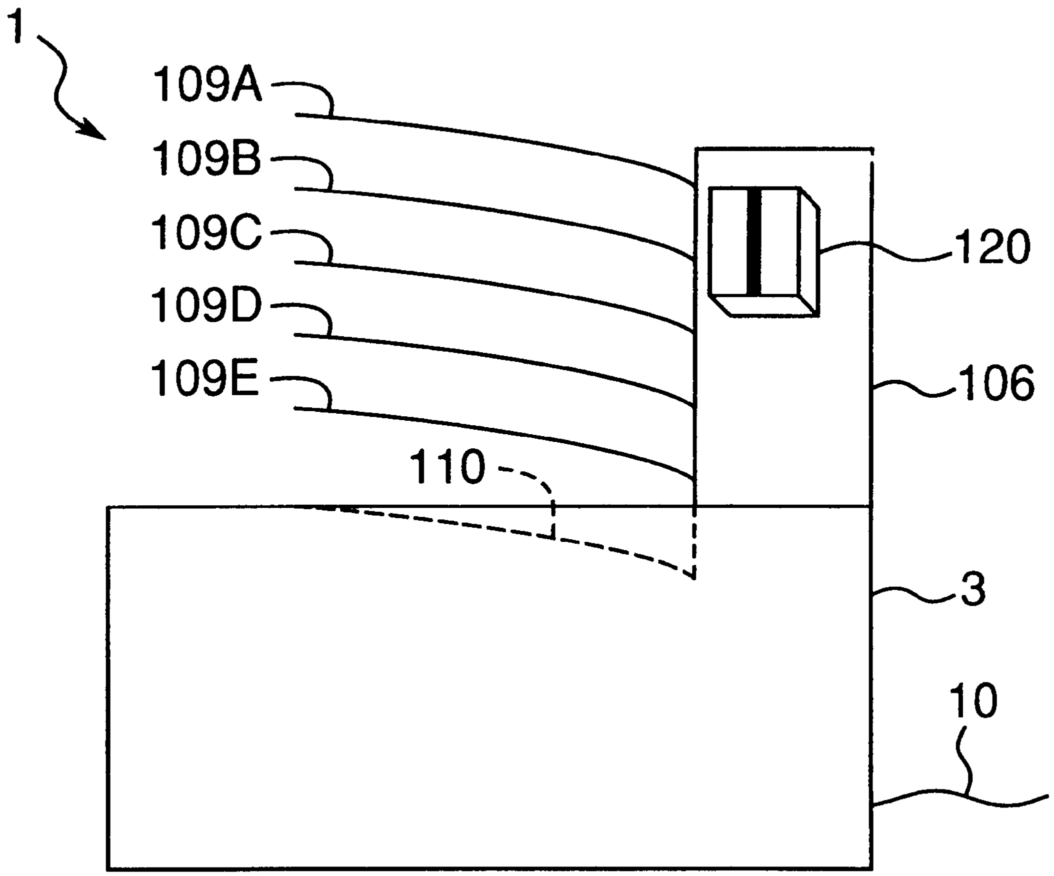
FIG. 1 is a diagram showing an external appearance of a printer according to one embodiment of the present invention.

The present invention will be described in detail below on the basis of embodiments shown in the drawings.

FIG. 1 shows an external appearance of a printer 1 according to one embodiment of the present invention, the printer 1 being connected to a network 10. This printer 1 includes a main body 3 and a finisher 106. The main body 3 has a built-in print engine for outputting print on sheets and a standard sheet discharge tray 110 formed in its upper portion. The finisher 106 has a plurality of mail bins 109A, 109B, . . . , 109E that protrude above the standard sheet discharge tray 110. The finisher 106 sorts and discharges the printed sheets onto the standard sheet discharge tray 110 or the mail bins 109A, 109B, . . . , 109E. A card reading device 120 is mounted on a side surface of the finisher 106 so as to read an ID card for identifying a user.

Figure 2:
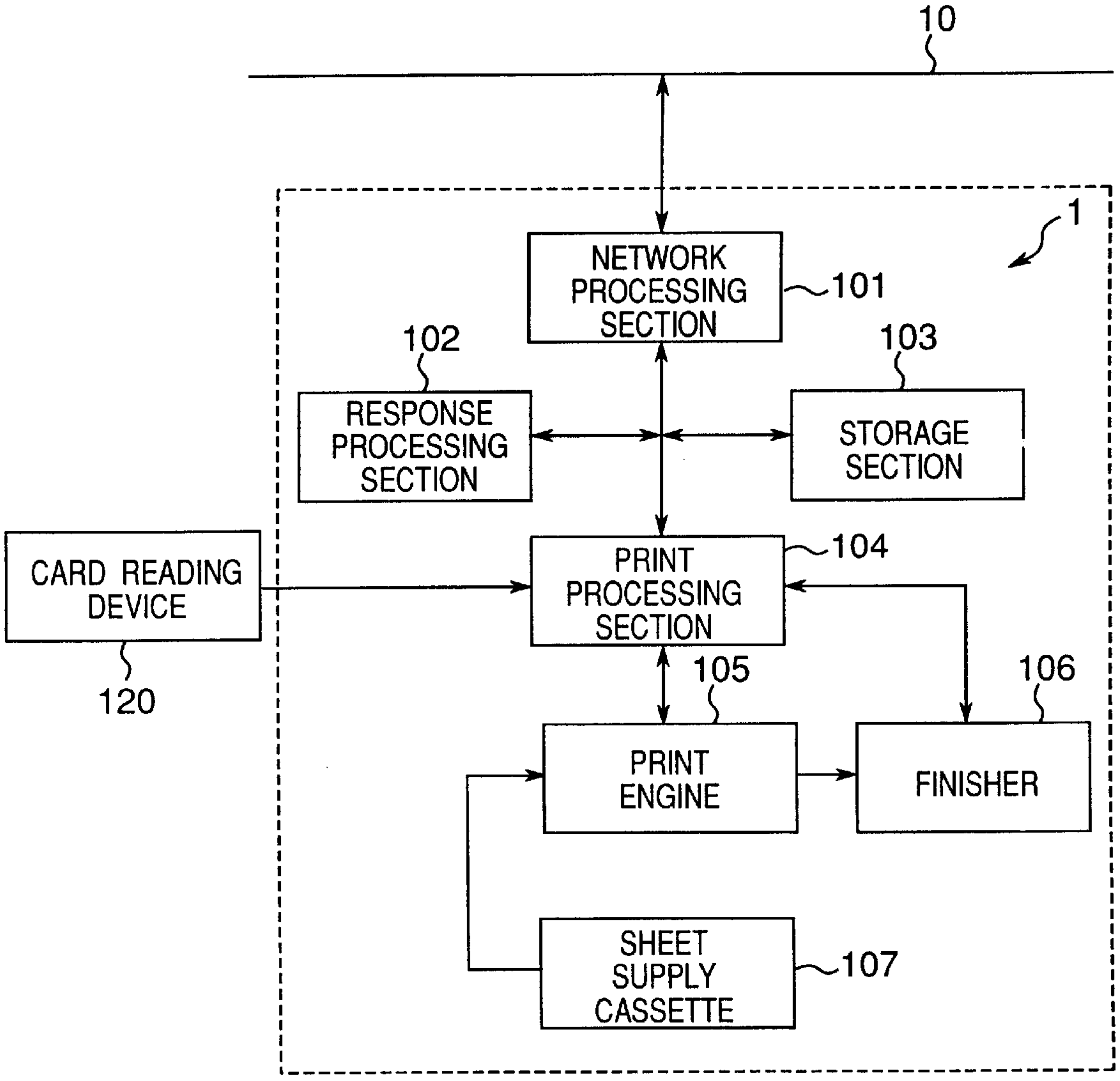
FIG. 2 is a block diagram of the above printer.

FIG. 2 shows a block diagram of the printer 1. This printer 1 is constructed of a print-processing section 104, a print engine 105, a sheet supply cassette 107, the above-mentioned finisher 106, a network processing section 101, a storage section 103 and a response processing section. 102. The print processing section 104 executes a control process of the whole printer. The print engine 105 outputs print on sheets. The sheet supply cassette 107 contains sheets having a specified size. The network processing section 101 executes control of data transfer between the network 10 and the printer 1. The storage section 103 stores information of the presence or absence and the size of a sheet contained in the sheet supply cassette 107, data processing resolution, manageable page-description language and so on. The response processing section 102 transmits information, which is stored in the storage section 103 according to an inquiry request from a terminal such as personal computer (not shown) connected to the network 10, to the terminal.

Figure 3:
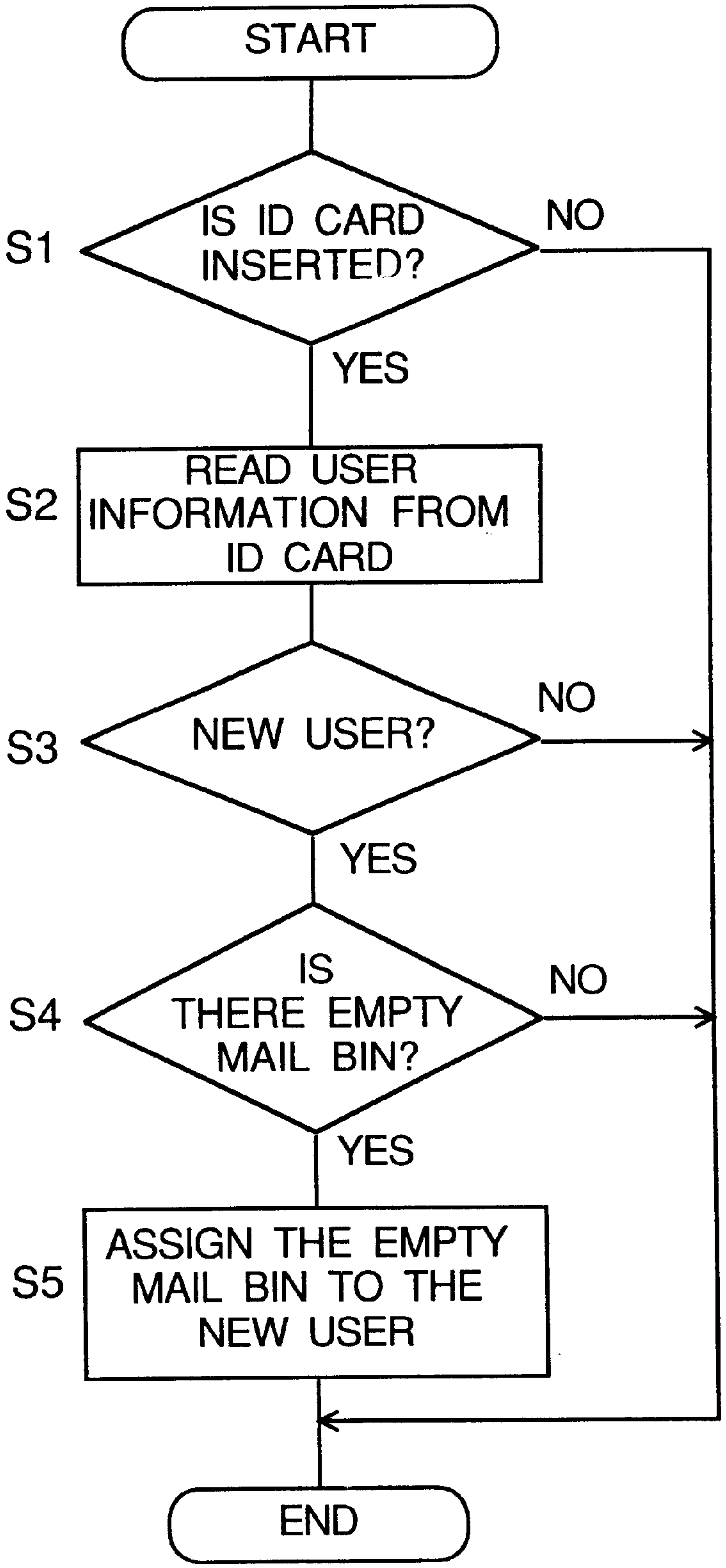
FIG. 3 is a chart showing an example of a mail bin assigning process flow in the above printer.

As shown in FIG. 3, the mail bins 109A, 109B, . . . , 109E are respectively assigned to users by the print processing section 104 that operates as assigning means. Specifically, the print processing section 104 first determines whether or not an ID card is inserted in the card reading device 120 (S1) and identifies a user of the ID card from the information read by the card reading device 120 when the ID card is inserted in the card reading device 120 (S2). Then, it is determined whether or not the user is a new user, i.e., whether or not a mail bin has already been assigned to the user (S3). If the user is a new user, it is determined whether or not there is a mail bin that has not yet been assigned (this bin being referred to as an "empty mail bin" hereinafter) among the mail bins 109A, 109B, . . . , 109E (S4). If there is an empty mail bin, then the empty mail bin is assigned to the user (S5). In this example, if the user is not a new user, then another mail bin is not assigned to the new user. Even if there is no empty mail bin, a plurality of users do not use one mail bin in common.

Figure 4:
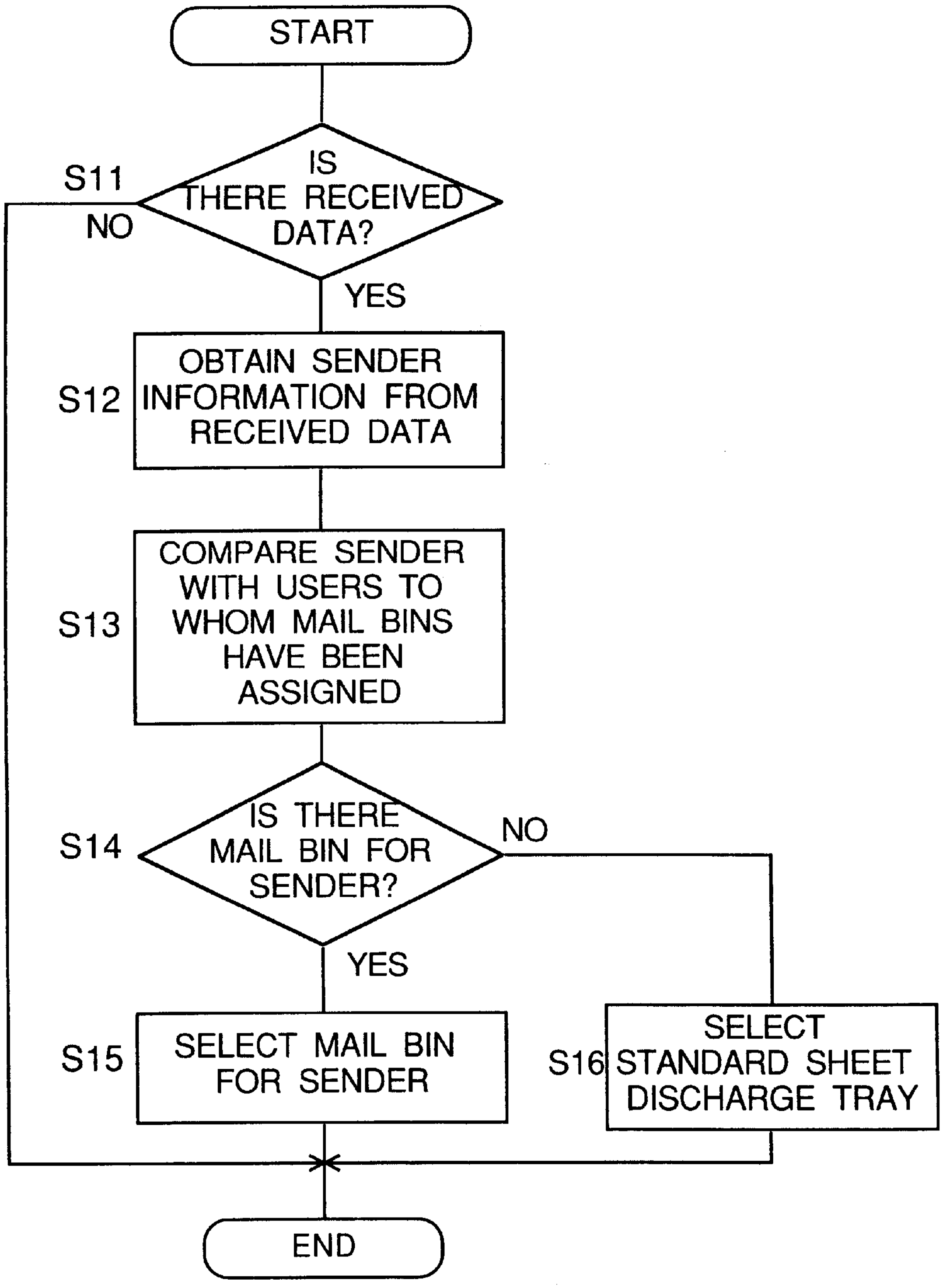
FIG. 4 is a chart showing a print job processing flow in the above printer.

When a user dispatches a print job to the printer 1 from a terminal (not shown) connected to the network 10 so as to output print on sheets and discharge the sheets onto a mail bin assigned to the user, then a process as shown in FIG. 4 is executed. First, the print processing section 104 determines whether or not there is data received through the network 10, i.e., whether or not the network processing section 101 has received a print job (S11). If the network processing section 101 has received the print job, then the network processing section 101 obtains information of a sender included in the received data i.e. information of a new user who dispatches a print job to the printer 1 from the terminal (S12). Subsequently, the sender is compared with the users to whom the mail bins have already been assigned (S13), and it is determined whether or not there is a mail bin to be assigned-to the sender (S14). If there is the mail bin to be assigned to the sender, the print processing section 104 sends the finisher 106 instructions of selecting the mail bin to be-assigned to the sender. On the other hand, the print engine 105 takes out sheets one by one from the sheet supply cassette 107, outputs print on each sheet and feeds the printed sheets into the finisher 106. The finisher 106, discharges the printed sheets onto the mail bin assigned to the sender according to the above instructions from the print processing section 104 (S15). If there is no mail bin assigned to the sender (S14), the printed sheets are discharged onto the standard sheet discharge tray 110 (S16).

In the case of the above arrangement, even when a organizational change or a personnel change occurs in an office or the like, it is not necessary to redo the mail bin assignment by operating an operation panel on the main body 3 of the image forming apparatus or by operating the utility at the terminal of the network 10, facilitating mail bin assignment. As a result, the labor of network management can be saved.

Figure 5:
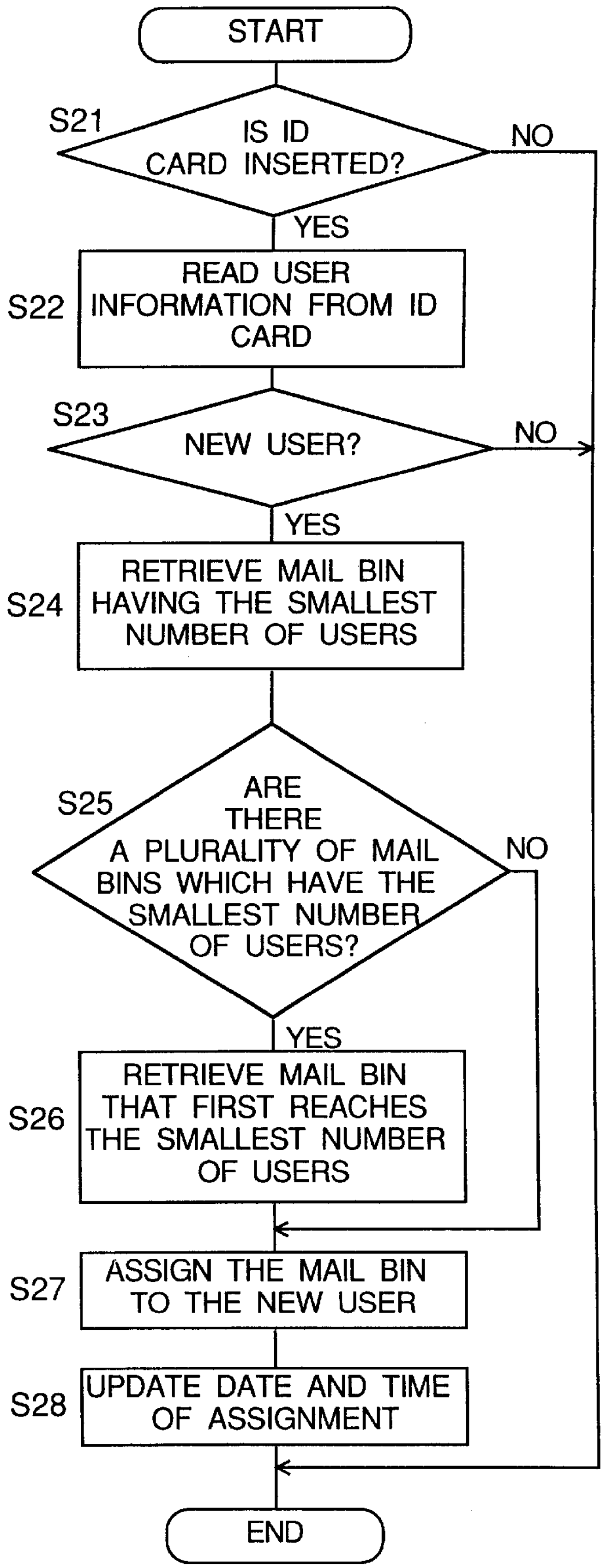
FIG. 5 is a chart showing an example of an assigning process flow in assigning each mail bin to a plurality of users in the above printer.

If the number of users is greater than the number of mail bins and there is no empty mail bin, then sharing of the mail bins is required to be permitted. FIG. 5 shows an example of a flow of assigning each mail bin to a plurality of users in the above-mentioned case. It is assumed that the print processing section 104 is consistently monitoring the frequency in use of the mail bins 109A, 109B, . . . , 109E. First, the print processing section 104 determines whether or not an ID card is inserted into the card reading device 120 (S21) and identifies a user of the ID card from the information read by the card reading device 120 when an ID card is inserted into the card reading device 120 (S22). Then, it is determined whether or not the user is a new user, i.e., whether or not a mail bin has already been assigned to the user (S23). If the user is a new user, then a mail bin which is assigned to the smallest number of users is retrieved from among the plurality of mail bins 109A, 109B, . . . , 109E (S24). If there are a plurality of mail bins which each are assigned to the smallest number of users (S25), then the mail bin that was first assigned to the smallest number of users is retrieved (S26) to be selected and assigned to the above-mentioned user (S27). Further, the date and time of assignment is updated (S28).

When a mail bin which was first assigned to the smallest number of users is selected and assigned to a new user as stated above, the number of users in a specified mail bin is does not excessively increase, consequently averaging the number of users in each mail bin. Therefore, a greater number of users can smoothly use the mail bins. Furthermore, if there are a plurality of mail bins which each are assigned to the smallest number of users, then the mail bin that first reached the smallest number of users is selected. Therefore, the number of users in a certain mail bin does not rapidly increase, and this can avoid confusion ascribed to the increase in the number of users in each mail bin.

Figure 6:
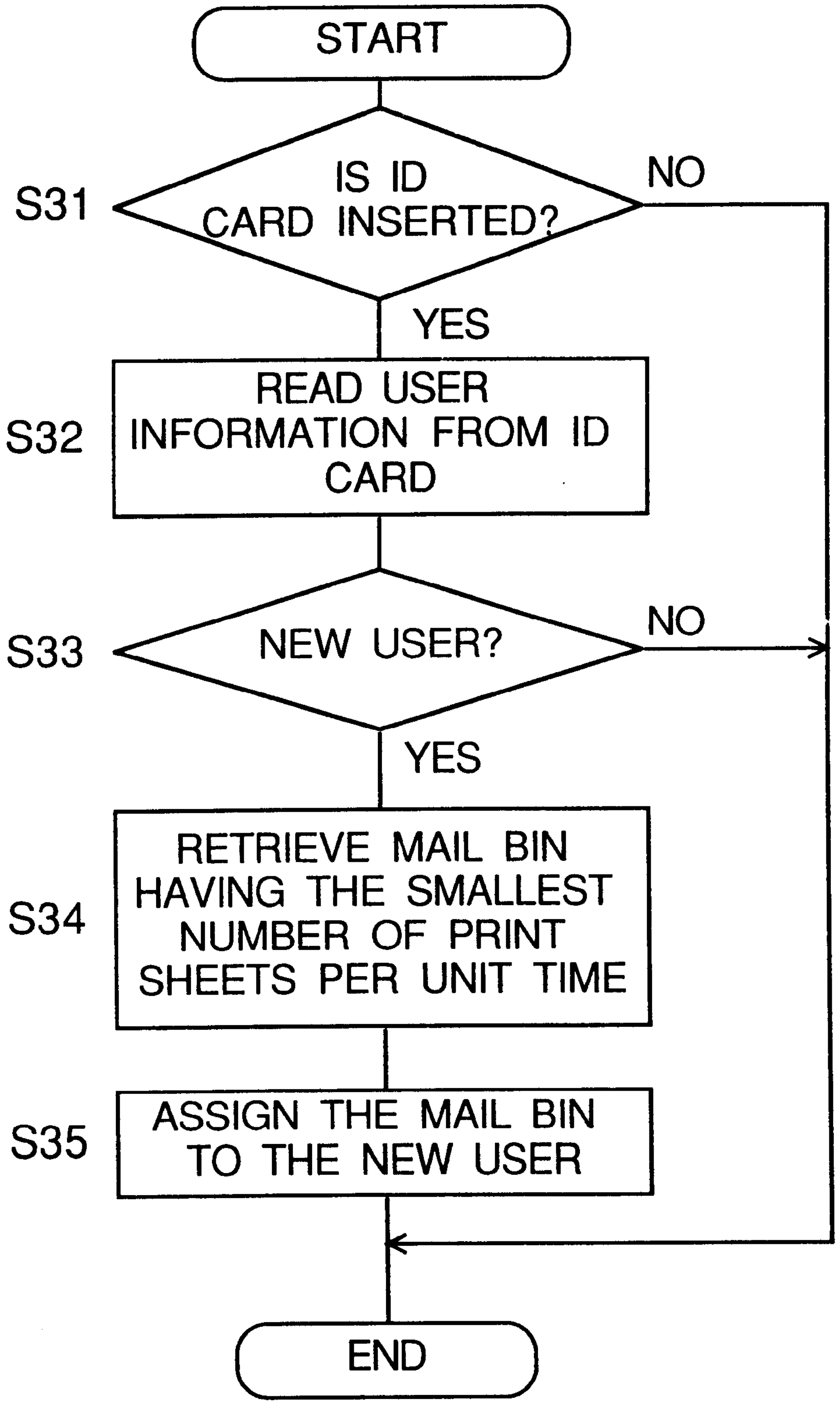
FIG. 6 is a chart showing another assigning process flow in assigning each mail bin to a plurality of users in the above printer.

FIG. 6 shows an example of another flow of assigning each mail bin to a plurality of users. It is assumed that the print processing section 104 is consistently monitoring the frequency in use of the mail bins 109A, 109B, . . . , 109E, in the same manner as the above-mentioned example. First, the print processing section 104 determines whether or not an ID card is inserted into the card reading device 120 (S31) and identifies a user of the ID card from the information read by the card reading device 120 when the ID card is inserted into the card reading device 120 (S32). Then, it is determined whether or not the user is a new user, i.e., whether or not a mail bin has already been assigned to the user (S33). If the user is a new user, a mail bin of the smallest number of print sheets discharged per unit time is retrieved from among the plurality of mail bins 109A, 109B, . . . , 109E (S34), and the mail bin is selected and assigned to the above-mentioned user (S35).

If the mail bin having the smallest number of print sheets discharged per unit time is thus selected, then, with relation to the mail bins used with a comparatively high frequency, the increase in the number of users is restricted, and this can avoid confusion ascribed to the increase in the number of users in the mail bins.

If the number of users is greater than the number of mail bins and therefore each mail bin is assigned to a plurality of users, then in addition to the above method there can be considered a method for carrying out assignment of each mail bin to users so as not to overlap his printout time zones with the other ones, by comparing a printout time zone in which the user who is about to undergo mail bin assignment principally puts printout into practice with a printout time zone in which users who have already undergone mail bin assignment put printout into practice.

Figure 7:
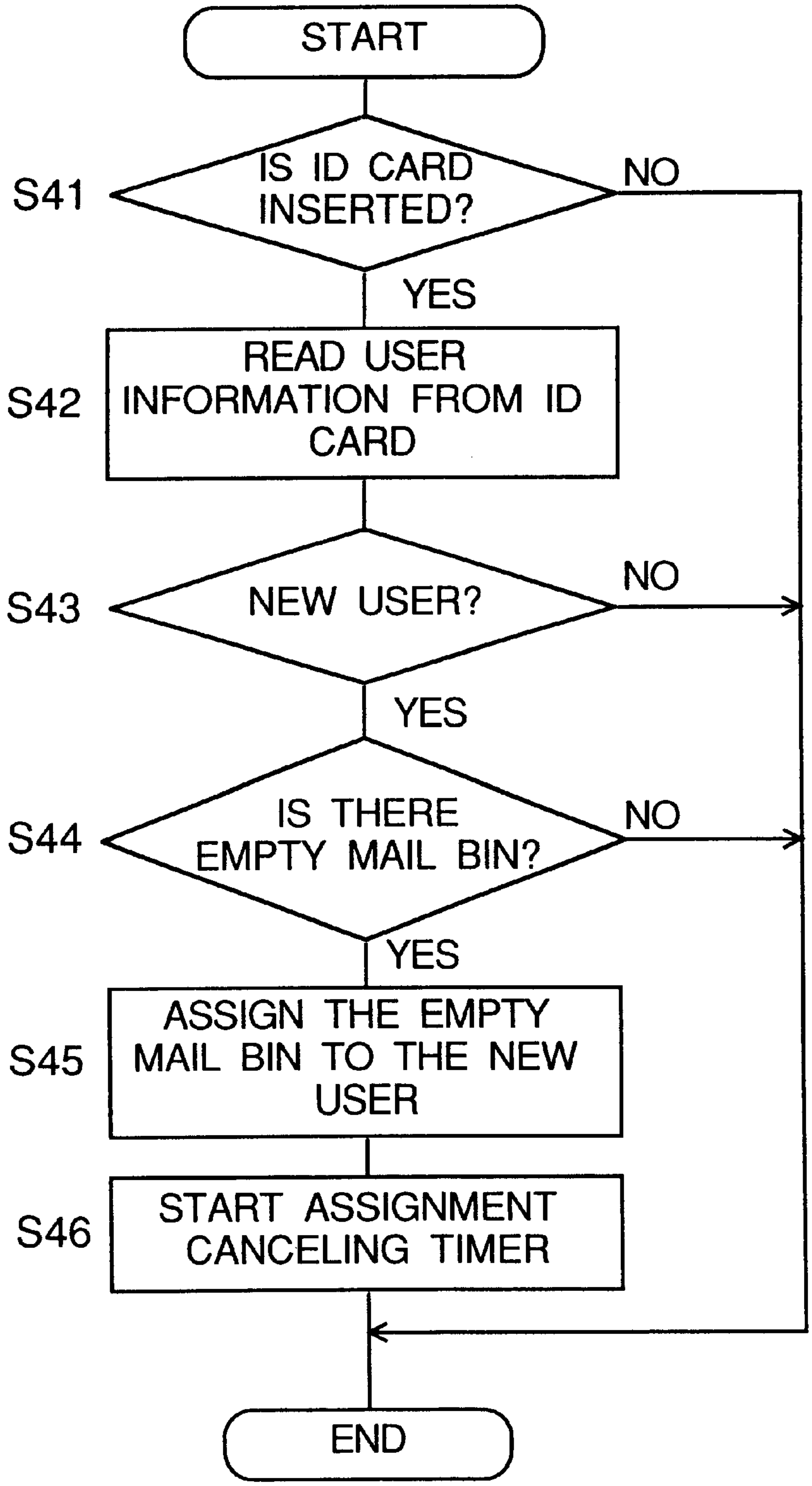
FIG. 7 is a chart showing a mail bin assigning process flow on the assumption that an mail bin assignment is compulsorily canceled in the above printer.
Figure 8:
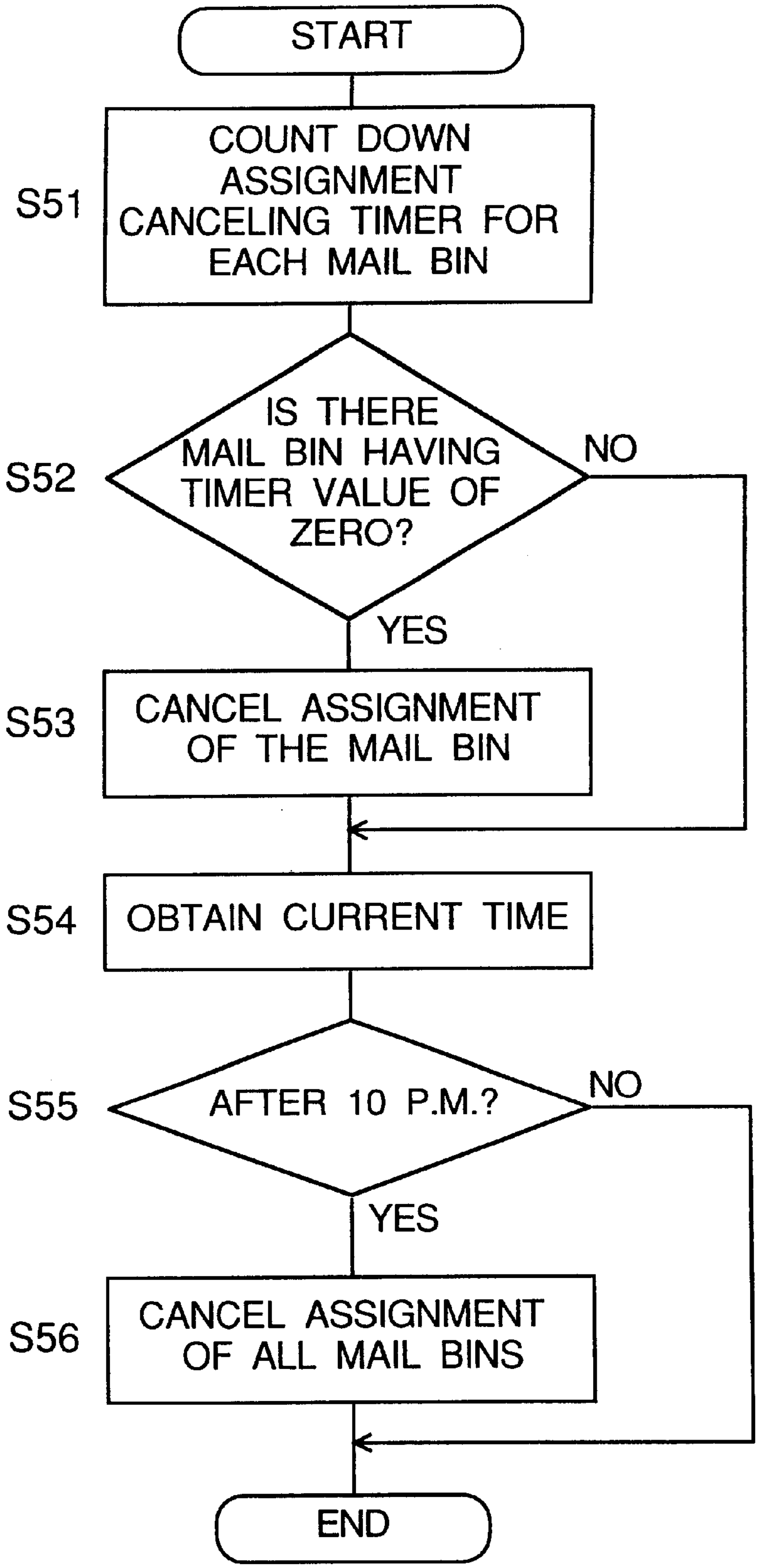
FIG. 8 is a chart showing a mail bin assignment canceling process flow in the above printer.
Figure 9:
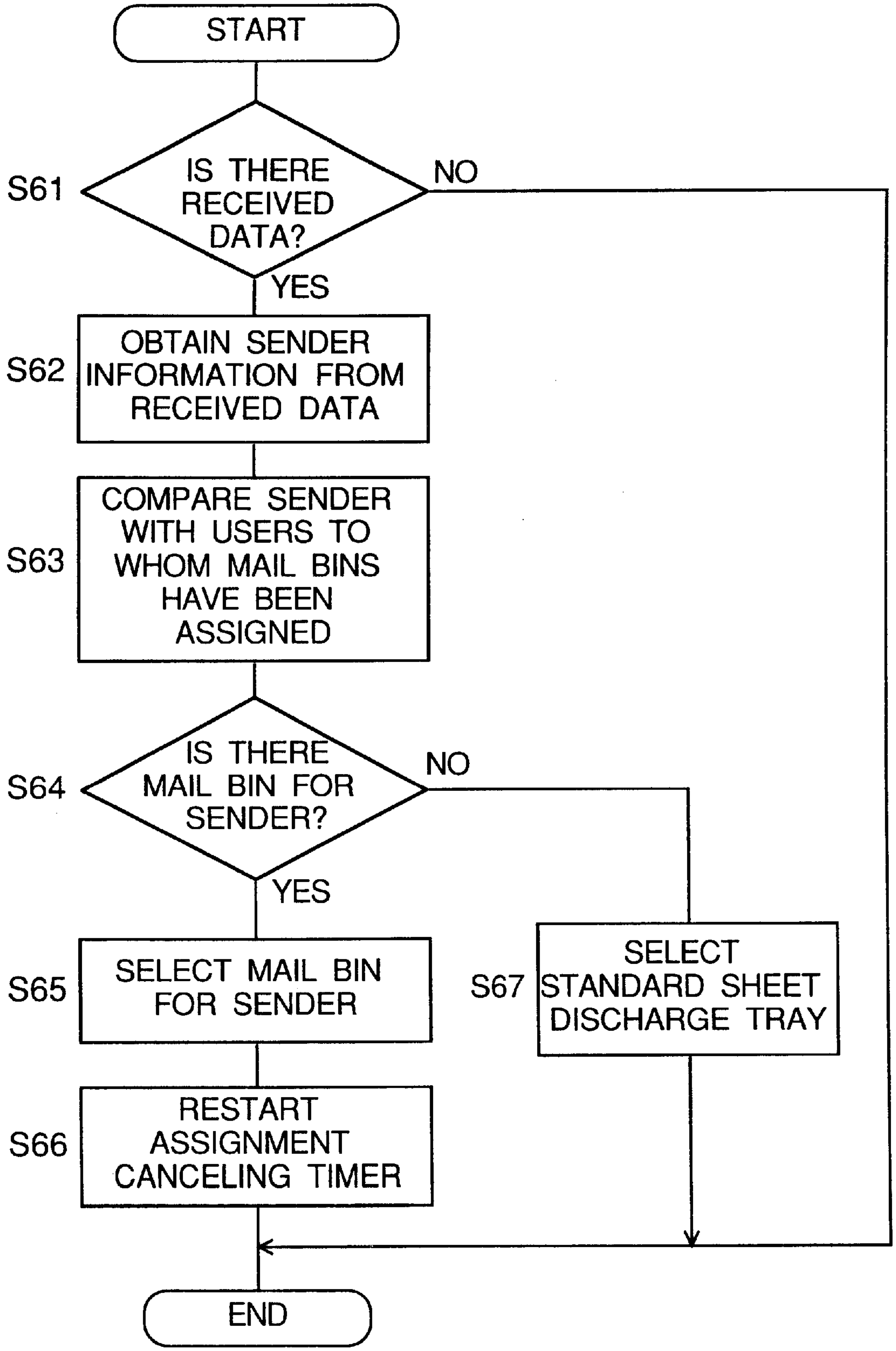
FIG. 9 is a chart showing a print job processing flow on the assumption that the mail bin assignment is compulsorily canceled in the above printer.

FIG. 7, FIG. 8 and FIG. 9 show flows including a process for compulsorily canceling the mail bin assignment in order to avoid confusion in assignment when the number of users is greater than the number of mail bins. It is assumed that the print processing section 104 operating as canceling means has a built-in assignment canceling timer in which a count time of 30 minutes has been preparatorily set in correspondence with each mail bin in order to compulsorily cancel the mail bin assignment.

As shown in FIG. 7, in the mail bin assignment stage, the print processing section 104 first determines whether or not an ID card is inserted into the card reading device 120 (S41) and identifies a user of the ID card from the information read by the card reading device 120 when an ID card is inserted into the card reading device 120 (S42). Then, it is determined whether or not the user is a new user, i.e., whether or not a mail bin has already been assigned to the user (S43). If the user is a new user, then it is determined whether or not there is an empty mail bin among the mail bins 109A, 109B, . . . , 109E (S44). If there is an empty mail bin, then the empty mail bin is assigned to the new user (S45). Then, at the instant when the mail bin is assigned, the built-in assignment canceling timer that belongs to the print processing section 104 and used for the mail bin starts countdown (S46). In this example, if the user is not a new user, then no other mail bin is assigned to the user. Also, even if there is no empty mail bin, one mail bin is not assigned to a plurality of users.

When the user dispatches a print job to the printer 1 from a terminal (not shown) connected to the network 10 so as to output print to the mail bin assigned to the user himself or herself during the countdown of this built-in assignment canceling timer, a process as shown in FIG. 9 is-executed. First, the print processing section 104 determines whether or not there is received data through the network 10, i.e., whether or not the network processing section 101 has received a print job (S61). If the network processing section 101 has received a print job, then information representing the sender included in the received data is obtained (S62). Subsequently, the sender is compared with the users to whom the mail bins have already been assigned (S63), and it is determined whether or not there is a mail bin assigned to the sender (S64). If there is a mail bin assigned to the sender, then the print processing section 104 sends to the finisher 106 an instruction to select the mail bin assigned to the sender. On the other hand, the print engine 105 takes out sheets one by one from the sheet supply cassette 107, outputs print on each sheet and feeds the printed sheet into the finisher 106. The finisher 106 discharges the printed sheet onto the mail bin assigned to the sender according to the above instruction from the print processing section 104 (S65). Then, the countdown of the assignment canceling timer of the mail bin is restarted (S66). If there is no mail bin assigned to the sender (S64), then the printed sheets are discharged onto the standard sheet discharge tray 110 (S66).

From the instant when a mail bin is assigned to a user or from the instant when reception of a final print-job from the user is completed, as shown in FIG. 8, the assignment canceling timer of each mail bin is counted down (S51). Then, it is determined whether or not there is a mail bin of which the timer value becomes zero (S52). If there is a mail bin of which the timer value becomes zero, then the assignment of the mail bin is canceled (S53). That is, if no print job is received from a specified user to whom a certain mail bin has been assigned for a specified period (30 minutes in this example), then the assignment of the mail bin to the user is canceled. By this operation, only the user who actually uses the mail bin can maintain the assignment of the mail bin, while the assignment of the mail bin is canceled for the user who does not use the assigned mail bin for a specified period. Therefore, in the case where the number of the users is greater than the number of the mail bins or in a similar case, a greater number of users can smoothly use the mail bins. Time of the assignment canceling timer is set to 30 minutes because it is highly possible that the user who once obtains print would correct the contents through visual check and put print output into practice again, the time necessary for the correcting work being empirically presumed to be 30 minutes. Also, it is highly possible that the user would not subsequently use the printer for a time.

Next, the print processing section 104 obtains the current time referring to a built-in clock (S54), and after 10 p.m. every day (S55), it cancels the assignment of all the mail bins (S56). Therefore, the mail bin assignment set during normal working hours of the day is infallibly canceled. Therefore, in the case where the number of users is greater than the number of mail bins, a greater number of users can smoothly use the mail bins.

This kind of canceling process can also be applied to the case where each mail bin is assigned to a plurality of users.

It is acceptable to cancel a mail bin assignment to a user when an ID card of the user is pulled out of the card reading device 120. In the above case, a mail bin is assigned to the user only when the user inserts the ID card into the card reading device 120, i.e., only when the user actually needs the mail bin. After the ID card is pulled out, the mail bin is regarded as unnecessary and the assignment of the mail bin is canceled. Further, it is also acceptable to cancel the assignment of a mail bin to a user when the user inserts again an ID card of the user into the card reading device 120 after the completion of a print job instead of the time when the ID card is pulled out of the card reading device 120.

Although the user dispatches a print job to the printer 1 from the terminal connected to the network 10 so as to output print to the mail bin assigned to the user himself or herself in the present embodiment, the present invention is of course not limited to this. Another sender may dispatch a print job to the printer 1 from a terminal connected to the network 10 so as to output print to the mail bin assigned to a certain user.

The present invention can be broadly applied to not only the so-called printer but also apparatuses such as a copying machine and a facsimile apparatus, which sort and discharge printed sheets into a plurality of mail bins.

As is apparent from the above, according to the image forming apparatus of the present invention, the assigning means identifies the user from the ID information read by the card reading device and assigns a mail bin to the user. As a result, the print that is outputted from the printer section and addressed to the user is discharged onto the mail bin assigned to the user. This facilitates the mail bin assignment and allows the saving of labor of network management.

The invention being thus described, it will be obvious that the same may be varied in many ways. Such variations are not be regarded as a departure from the spirit and scope of the invention, and all such modifications as would be obvious to one skilled in-the art are intended to be included within the scope of the following claims.

What is claimed is:

1. An image forming apparatus, comprising:

an image forming section for forming an image on a heet;

a plurality of bins;

a card reading device for reading information from an ID card;

assigning means for assigning a bin to a user corresponding to the information read by the card reading device; and discharging means for discharging the sheet on which the image is formed by the image forming section into the bin assigned by the assigning means.

2. An image forming apparatus as claimed in claim 1, wherein the assigning means determines whether or not a bin has already been assigned to the user corresponding to the information read by the card reading device.

3. An image forming apparatus as claimed in claim 2, wherein the assigning means is configured to select a bin which is assigned to a smallest number of users from among the plurality of bins when no bin has yet been assigned to the user corresponding to the information read by the card reading device, to assign the bin to the user.

4. An image forming apparatus as claimed in claim 3, wherein the assigning means is configured to select a bin that first reaches the smallest number of users when there are a plurality of bins which each are assigned to the smallest number of users, to assign the bin to the user.

5. An image forming apparatus as claimed in claim 1, wherein the assigning means is configured to select a bin receiving a smallest number of sheets discharged per unit time, to assign the bin to the user.

6. An image forming apparatus as claimed in claim 1, further comprising:

canceling means for canceling assignment of a certain bin to a specified user when a print job from the specified user to whom the certain bin has been assigned is not received for a fixed time.

7. An image forming apparatus as claimed in claim 1, further comprising:

canceling means for canceling assignment of all bins to all users at an appointed time.

8. An image forming apparatus as claimed in claim 1, further comprising:

canceling means for canceling assignment of the bin to the user when the ID card of the user is pulled out of the card reading device.

9. An image forming apparatus as claimed in claim 1, wherein the assigning means is configured to select an empty bin that has not yet been assigned to assign the empty bin to the user.

10. An image forming apparatus as claimed in claim 9, wherein the assigning means is configured to select a specified sheet container when no empty bin exists to assign the specified sheet container to the user.

11. A sheet container unit that sorts inputted sheets into a plurality of bins and contains the inputted sheets, comprising:

card reading device for reading information from an ID card;

assigning means for assigning a bin to a user corresponding to the information read by the card reading device; and discharging means for discharging an inputted sheet into the bin assigned by the assigning means.

12. A sheet container unit as claimed in claim 11, wherein the assigning means determines whether or not a bin has already been assigned to the user corresponding to the information read by the card reading device.

13. A sheet container unit as claimed in claim 12, wherein the assigning means is configured to select a bin which is assigned to a smallest number of users from among the plurality of bins when no bin has yet been assigned to the user corresponding to the information read by the card reading device, to assign the bin to the user.

14. A sheet container unit as claimed in claim 13, wherein the assigning means is configured to select a bin that first reaches the smallest number of users when there are a plurality of bins which each are assigned to the smallest number of users, to assign the bin to the user.

15. A sheet container unit as claimed in claim 11, wherein the assigning means is configured to select a bin receiving a smallest number of sheets discharged per unit time, to assign the bin to the user.

16. A sheet container unit as claimed in claim 11, further comprising:

canceling means for canceling assignment of a certain bin to a specified user when a print job from the specified user to whom the certain bin has been assigned is not received for a fixed time.

17. A sheet container unit as claimed in claim 11, further comprising:

canceling means for canceling assignment of all bins to all users at an appointed time.

18. A sheet container unit as claimed in claim 11, further comprising:

canceling means for canceling assignment of the bin to the user when the ID card of the user is pulled out of the card reading device.

19. A sheet container unit as claimed in claim 11, wherein the assigning means is configured to select an empty bin to assign the empty bin to the user.

20. A sheet container unit as claimed in claim 19, wherein the assigning means is configured to select a specified sheet container when no empty bin exists to assign the specified sheet container to the user.

* * * * *